US008775655B2

(12) United States Patent
Zhang

(10) Patent No.: US 8,775,655 B2
(45) Date of Patent: Jul. 8, 2014

(54) SYSTEM AND METHOD FOR PRESENTING STREAMING MEDIA CONTENT

(75) Inventor: Xinyan Zhang, Nanjing (CN)

(73) Assignee: Roxbeam Media Network Corporation, Road Town, Tortola (VG)

( * ) Notice: Subject to any disclaimer, the term of this patent is extended or adjusted under 35 U.S.C. 154(b) by 1100 days.

(21) Appl. No.: 11/255,387

(22) Filed: Oct. 21, 2005

(65) Prior Publication Data
US 2007/0094405 A1    Apr. 26, 2007

(51) Int. Cl.
G06F 15/16    (2006.01)
H04L 29/06    (2006.01)
(52) U.S. Cl.
CPC ................................ *H04L 29/06306* (2013.01)
USPC ......................................... 709/231; 709/232
(58) Field of Classification Search
CPC ................................................ H04L 29/06306
USPC .................................................. 709/231, 232
See application file for complete search history.

(56) References Cited

U.S. PATENT DOCUMENTS

| 2003/0212804 A1* | 11/2003 | Hashemi | 709/228 |
| 2006/0069798 A1* | 3/2006 | Li et al. | 709/231 |
| 2006/0080454 A1* | 4/2006 | Li | 709/231 |
| 2008/0134258 A1* | 6/2008 | Goose et al. | 725/91 |

OTHER PUBLICATIONS

Tang et al. ("slow motion in video streaming", Su Tang, Zoran Salcic, 2003, IEEE, pp. 1184-1187).*
R. Stevens, "TCP/IP Illustrated," vol. 1, Ch. 1 et seq., Addison-Wesley (1994).
X. Zhang et al., "Coolstreaming/DONet: A Data-driven Overlay Network for Peer-to-Peer Live Media Streaming," INFOCOM 2005, 24th Ann. Jt. Conf of the IEEE Comp. and Comm. Societies, Proc. IEEE vol. 3, 13-17, pp. 2102-2111 (Mar. 2005).

* cited by examiner

*Primary Examiner* — Dustin Nguyen
*Assistant Examiner* — Joel Mesa
(74) *Attorney, Agent, or Firm* — Sun Yao; Park, Vaughan, Fleming & Dowler LLP

(57) ABSTRACT

One embodiment provides a system and a method for presenting streaming media content delivered through a peer-to-peer overlay network. During operation, a data-transfer mechanism sends requests to a plurality of peer nodes to receive data for streaming media content. The system stores received data for the streaming media content into a buffer. Next, a server local to a media presentation mechanism serves the buffered data to a media presentation mechanism. The server controls the data serving in response to a signal received from the media-presentation mechanism.

14 Claims, 7 Drawing Sheets

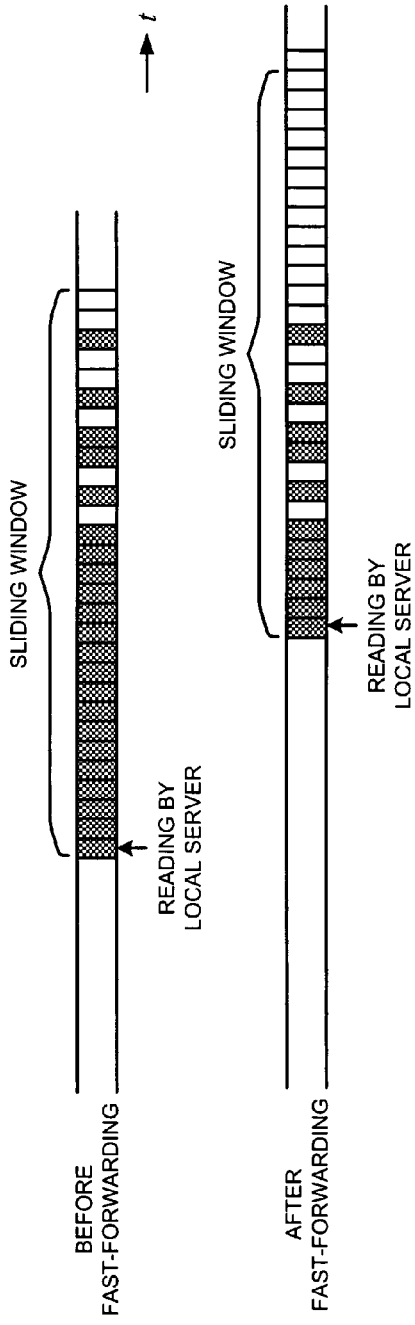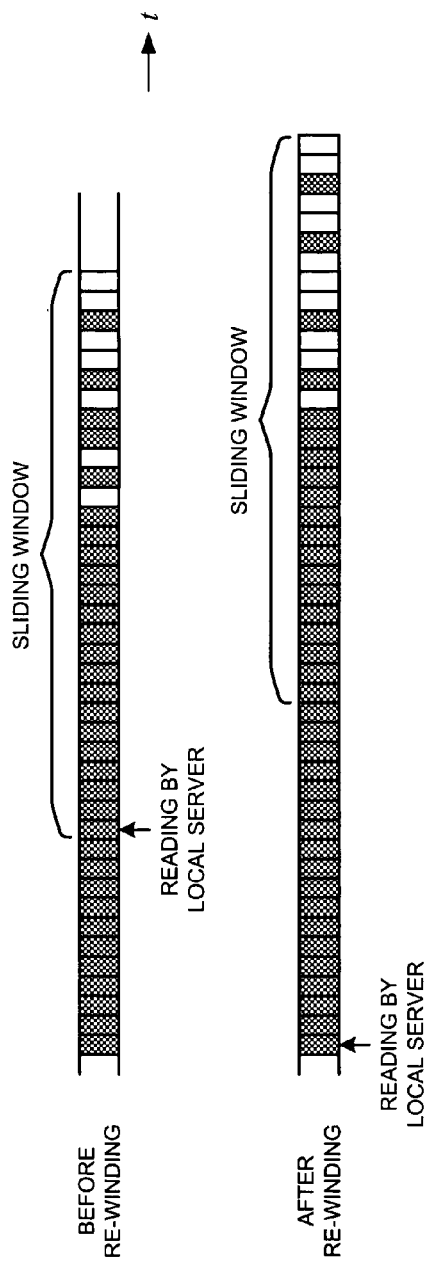

SYSTEM AND METHOD FOR PRESENTING STREAMING MEDIA CONTENT

FIELD OF THE INVENTION

The present invention relates to techniques for delivering media content over networks. More specifically, the present invention relates to a system and a method for presenting streaming media content to a user with increased flexibility and versatility.

BACKGROUND OF THE INVENTION

Presently, the ubiquity of Internet connectivity and the unprecedented growth in data communications access bandwidth has been fueling the demand for more versatile forms of on-line content. In particular, there has been an increasing demand for multi-media content, such as audio and video. Existing Internet applications, however, have yet to provide effective delivery of bandwidth-intensive multi-media content to end-users.

Video is one of the most bandwidth-demanding forms of on-line content. Traditionally, video, particularly live video, as well as audio, have been broadcast over cable programming networks. Bandwidth-demanding video signals, such as television (TV) channels, have only been offered to end-users by the cable programming networks. Although broadband cable service can provide both digital data and cable programming to end-users, cable programming is often carried separately from data services. Consequently, end-users are not able to enjoy high-bandwidth audio or video content over broadband networks that offer only Internet connectivity and not cable programming.

Successful delivery of high-quality video content over an Internet connection is subject to several constraints. In the past, access bandwidth has presented one bottleneck. For example, dial-up Internet services generally limit access bandwidth to 56 Kbps. Recent developments in access technologies, such as ADSL, VDSL, direct Ethernet connection, and WLAN, have largely removed this bottleneck by bringing multi-Mbps connections to end-users. Despite these advances, factors other than bandwidth limits, such as server overloading and network congestion, still pose potential constraints.

Most constraints not directly caused by limited link bandwidth are often the result of centralized data transfer, where media content is delivered based on a client-server model. According to the client-server model, an end-user starts a client program, which contacts a server where the content is stored, and downloads the content from the server. Although the end-user's Internet connection may provide sufficient bandwidth to accommodate one or more video channels, the server may be overloaded if a large number of other end-users are simultaneously requesting streaming video. In addition, the connection between the server and the network may be congested with other network traffic. High-performance servers and high-bandwidth network connections can mitigate these problems, but such solutions are not scalable and inevitably increase service-provisioning costs.

Peer-to-peer (P2P) overlay networks have recently attracted growing interest as one solution to delivering high-quality video content. A P2P network is formed as a logical layer operating over a conventional network infrastructure, such as implemented in the Internet. In a P2P network, peer machines are aware of the states of other peer machines and a group of peer nodes can directly exchange data or services among themselves. The task of content delivery is not undertaken by one particular server. Thus, P2P networks provide a favorable environment for delivering streaming data, such as video, because P2P networks can avoid server overloading and reduce network congestion. More importantly, a P2P network can scale gracefully as the number of users increases.

Presenting streaming media content delivered over a P2P network remains a challenge. Existing media-presentation applications, such as the Microsoft Windows Media Player or Real Networks Player, play on-line content by receiving streaming content from a single server. In a P2P network, however, a media-presentation application must be able to play data received from multiple servers simultaneously. Conventional, general-purpose media-presentation applications only download streaming media content from a single server using a single Internet Protocol (IP) address and are unsuitable for playing streaming content in a P2P environment. Moreover, existing media-presentation technology also limits playback of streaming media content. For example, a user cannot fast-forward or rewind live streaming content. By comparison, P2P data transfer engines typically store incoming data into a local buffer and proprietary media-presentation applications can be implemented to read the data directly from these buffers. However, proprietary software is costly and incompatible with open standards.

Hence, there is a need for a system and a method for presenting streaming media content delivered over a P2P network with increased playback flexibility and versatility.

SUMMARY OF THE INVENTION

One embodiment provides a system and a method for presenting streaming media content delivered through a peer-to-peer overlay network. During operation, a data-transfer mechanism sends requests to a plurality of peer nodes to receive data for streaming media content. The system stores received data for the streaming media content into a buffer. Next, a server local to a media-presentation mechanism serves the buffered data to a media presentation mechanism. The server controls the data serving in response to a signal received from the media-presentation mechanism.

A further embodiment provides a system and a method for facilitating interactive presentation of streaming media content delivered through a peer-to-peer overlay network. During operation, a peer-to-peer engine receives data for streaming media content from a plurality of peer nodes. The system stores data for the streaming media content received by the peer-to-peer engine into a buffer. The system subsequently presents the streaming media content through a media-presentation mechanism. The system facilitates user-initiated control over presentation of the streaming media content by serving the stored data to the media-presentation mechanism and controlling the data serving in response to commands received from the media-presentation mechanism.

Still other embodiments will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 5 presents a timing diagram illustrating exemplary states of the data buffer before and after "fast-forwarding" of the media content, in accordance with one embodiment.

FIG. 6 presents a timing diagram illustrating exemplary states of the data buffer before and after logical "rewinding" of the media content, in accordance with one embodiment.

DETAILED DESCRIPTION

The data structures, operations, and instructions described in the detailed description are typically stored on a computer readable storage medium, which may be any device or medium that can store code or data for use by a computer system. Suitable media include, but are not limited to, application specific integrated circuits (ASICs), field-programmable gate arrays (FPGAs), semiconductor memories, magnetic and optical storage devices such as disk drives, magnetic tape, CDs (compact discs), and DVDs (digital versatile discs or digital video discs). Furthermore, a computer system can be any device or system capable of processing electronically-stored data.

Delivery of TV Signals over Cable Programming Networks

Figure 1:
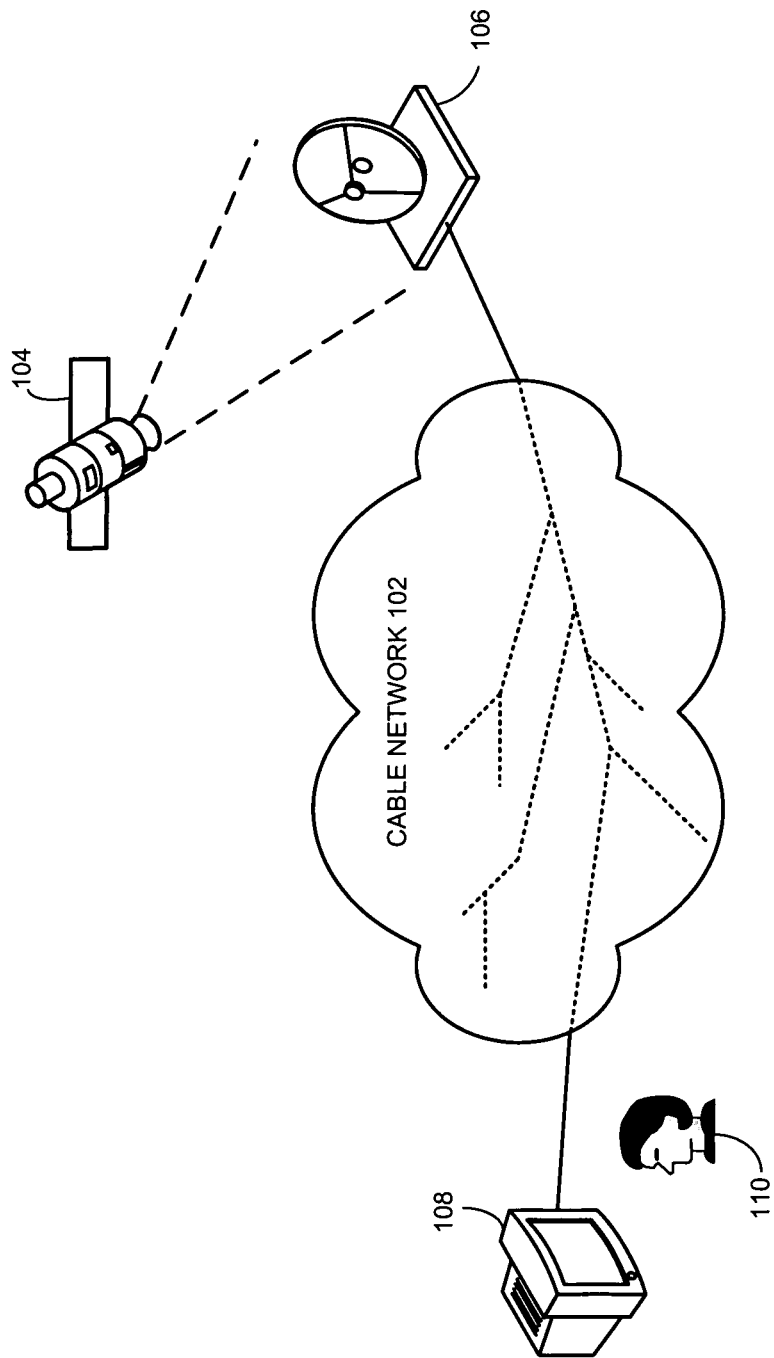
FIG. 1 illustrates a prior-art conventional cable programming network, which is used to deliver TV signals to end-users.

FIG. 1 illustrates a prior art conventional cable programming network 102 for delivering TV signals to end-users. The head-end of a cable programming network 102 is in communication with a satellite base station 106. Base station 106 receives signals for several TV channels relayed by a satellite 104. Base station 106 also encodes the received TV signals and transmits the signals onto the cable programming network 102.

Cable programming network 102 can be implemented over a conventional coaxial-cable network, or in a further embodiment, can be an optical-fiber network. At the user-end, the TV signals are typically carried by a copper coaxial cable that is routed to an end-user's residence or office. A TV set or receiver 108 receives the TV signals and presents the media content.

Cable networks are usually implemented in tree topologies to facilitate transmitting traffic downstream from the head-end to the tail-end. A coaxial cable can accommodate several TV channels simultaneously due to the large bandwidth available. In contrast, accommodating the simultaneous transmission of multiple TV channels over an Internet connection can be difficult due to significantly smaller available bandwidth.

Currently, Internet services are offered by Internet service providers (ISPs) over broadband cable networks, which are capable of offering significant downstream bandwidth. Other types of cable networks are possible. Nevertheless, due to the tree topology of cable networks, upstream bandwidth is shared by multiple Internet users and is limited on a per-user basis. Furthermore, although TV signals and Internet traffic can be carried over the same physical medium, the signals are transmitted independently. As a result, TV signals are usually unavailable in cable networks offering only Internet connectivity.

Presenting P2P Streaming Media Content Using Local Server

P2P networks have emerged as an effective solution to distributing objects that require significant network bandwidth and resources, such as audio or video files. In particular, a P2P network can deliver bandwidth-demanding streaming media by operating as a logical layer over an existing network infrastructure, such as the Internet or a wireless cellular network. A node in a P2P network not only requests and receives data from other peer nodes, but also shares any data locally stored with other peer nodes. Thus, a P2P-based content delivery system can avoid potential server overload and network congestion by distributing content among peer nodes.

P2P streaming technologies allow more efficient bandwidth utilization. However, presenting streaming media cost-effectively on a P2P network can be challenging. Conventional media-presentation applications, such as the Microsoft Windows Media Player or Real Networks Player, can present streaming media received directly from a single server over the Internet. For example, a user can specify content by entering a Uniform Resource Locator (URL) into a media player, which subsequently contacts the corresponding server, receives and buffers the data, and plays the content. In contrast, in a P2P network, an end-host receives data from multiple sources and a P2P-compliant media player must be able to play streaming data received from multiple sources. As a P2P data-transfer engine typically stores the incoming data into a local buffer, existing proprietary media players access the stored data directly from the local buffer. However, proprietary solutions are costly and may not work in different operating systems due to incompatibilities and licensing issues.

Thus, presenting P2P streaming media using existing and widely available legacy media-presentation applications is preferred. In one embodiment, a local server executing on the same machine as the media player channels incoming P2P data to the media player. The local server can be implemented as a software-based process, running in parallel with the P2P session and the media player. The local server fetches the P2P data stored in the local buffer and serves the data to the media player, which presents the media content as if received directly from a single remote server. In general, the local server acts as a logical shim between the media player and the P2P session and shields the media player from the underlying data-transfer. Moreover, the local server is not directly involved in the P2P data transfer and only reads the received data from the buffer. The P2P engine is responsible for scheduling downloads and uploads with other peer nodes. By implementing the local server as an interface between the P2P engine and the media player, the system can thereby allow conventional media-presentation applications on different platforms to play P2P streaming media.

Figure 2:
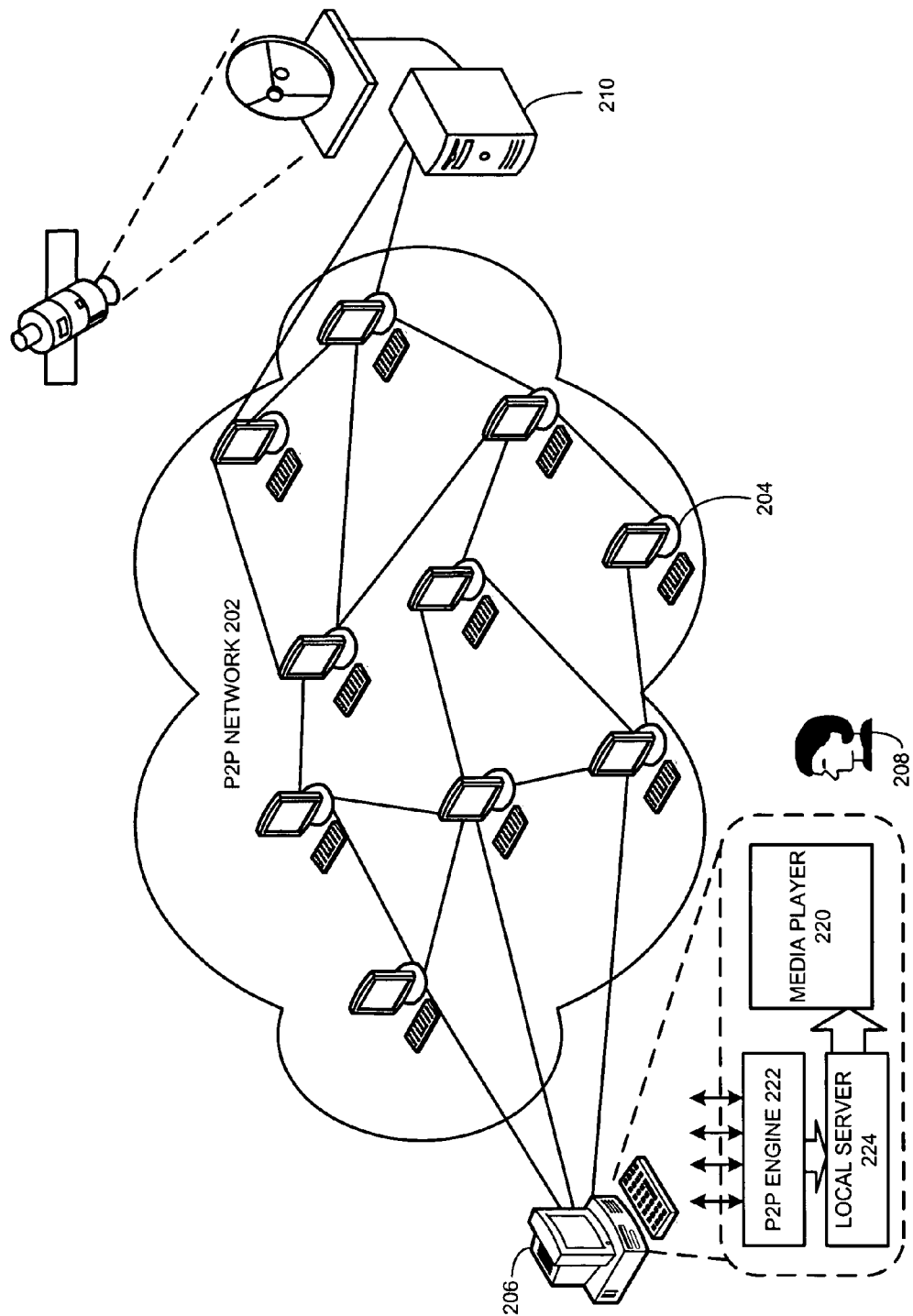
FIG. 2 illustrates a host facilitating a local server for presenting streaming media content received over a P2P network, in accordance with one embodiment.

FIG. 2 illustrates a host facilitating a local server for presenting streaming media content received over a P2P network, in accordance with one embodiment. An originating node 210 is in communication with a satellite base station and receives data for media content. Peer nodes, such as computer 204, form a P2P overlay network 202. The P2P network 202 can be formed as a logical layer over an underlying network infrastructure, such as the Internet or a wireless cellular network, which is implemented in accordance with the Transmission Control Protocol/Internet Protocol (TCP/IP), such as described in W. R. Stevens, "TCP/IP Illustrated," Vol. 1, Ch. 1 et seq., Addison-Wesley (1994), the disclosure of which is incorporated by reference. Other network infrastructures are possible.

A P2P overlay network is formed using widely-available conventional one-to-one unicast links. A one-to-one link is a point-to-point or end-to-end connection between two nodes in a packet-switched network implemented, for instance, using TCP/IP, although other network implementations or protocols are possible. By comparison, IP multicast, which also operates in a packet-switched network implementation, offers similar utilization of existing network infrastructure, but support for IP multicast remains limited for practical reasons, such as a lack of incentives for service providers to install multicast-capable routers. P2P overlay networks provide an application-level solution, which is implemented using unicast tunnels across cooperating and participating nodes, called overlay nodes. An overlay network provides multicasting by relaying data among the overlay nodes. An exemplary implementation of an overlay node is described in X. Zhang et al., "Coolstreaming/DONet: A Data-driven Overlay Network for Peer-to-Peer Live Media Streaming," INFO-COM 2005, 24th Ann. Jt. Conf. of the IEEE Comp. and Comm. Societies, Proc. IEEE Vol. 3, 13-17, pp. 2102-2111 (March 2005), the disclosure of which is incorporated by reference.

During operation, originating node 210 sends data for the media content to neighboring nodes, which are in communication with other peer nodes. The media content can pass from node to node via intermediate communication links to propagate to end host 206, which presents the received media content to an end-user 208. A P2P engine 222 within the end host 206 is responsible for receiving data from multiple peer nodes and transmitting locally stored data to other peer nodes. The P2P engine 222 is in communication with a local server 224 in the end host 206 and shares the received data with the local server 224.

The local server 224 channels the received data to a media player 220, which presents the streaming media content to user 208. The media player 220 can be any conventional, unicast-oriented media player capable of receiving a stream from a single server. The media player 220 receives the data from the local server 224 in the same manner as data received from a remote server. The media player 220 communicates with the local server 224 by identifying a local IP address assigned to the host 206. At the beginning of a P2P streaming session, the local server 224 can activate the media player 220 after the P2P engine 222 has received and buffered data sufficient to start playback.

Interactive Presentation of P2P Streaming Media Content

Implementing a local media server facilitates the presentation of streaming media over a P2P overlay network using conventional media players. However, media presentation is still passive. Although conventional media-presentation applications generally provide interactive playback functions, such as fast-forward and rewind, these functions are typically not operational with streaming media, as the one-way data transfer from server to media player does not allow a user to manipulate the playback. For example, when a local server sends data, the media player passively receives the data and plays the media at a fixed data rate. This configuration does not allow an end-user to adjust media playback through fast-forward, rewind, slow motion, pause, and other operations. Certain media players, for example, the Apple Quick-Time player, allow a user to access full playback features, such playback as fast forward and rewind, while downloading a media clip. However, these media players do not support such operations during a live streaming broadcast, because meta data about the entire media file is needed to support full playback features. During a live streaming broadcast, meta data may not be available because the stream could last for an arbitrary amount of time. One embodiment allows a media-presentation application to control data delivery by the local server and facilitate interactive presentations.

Figure 3:
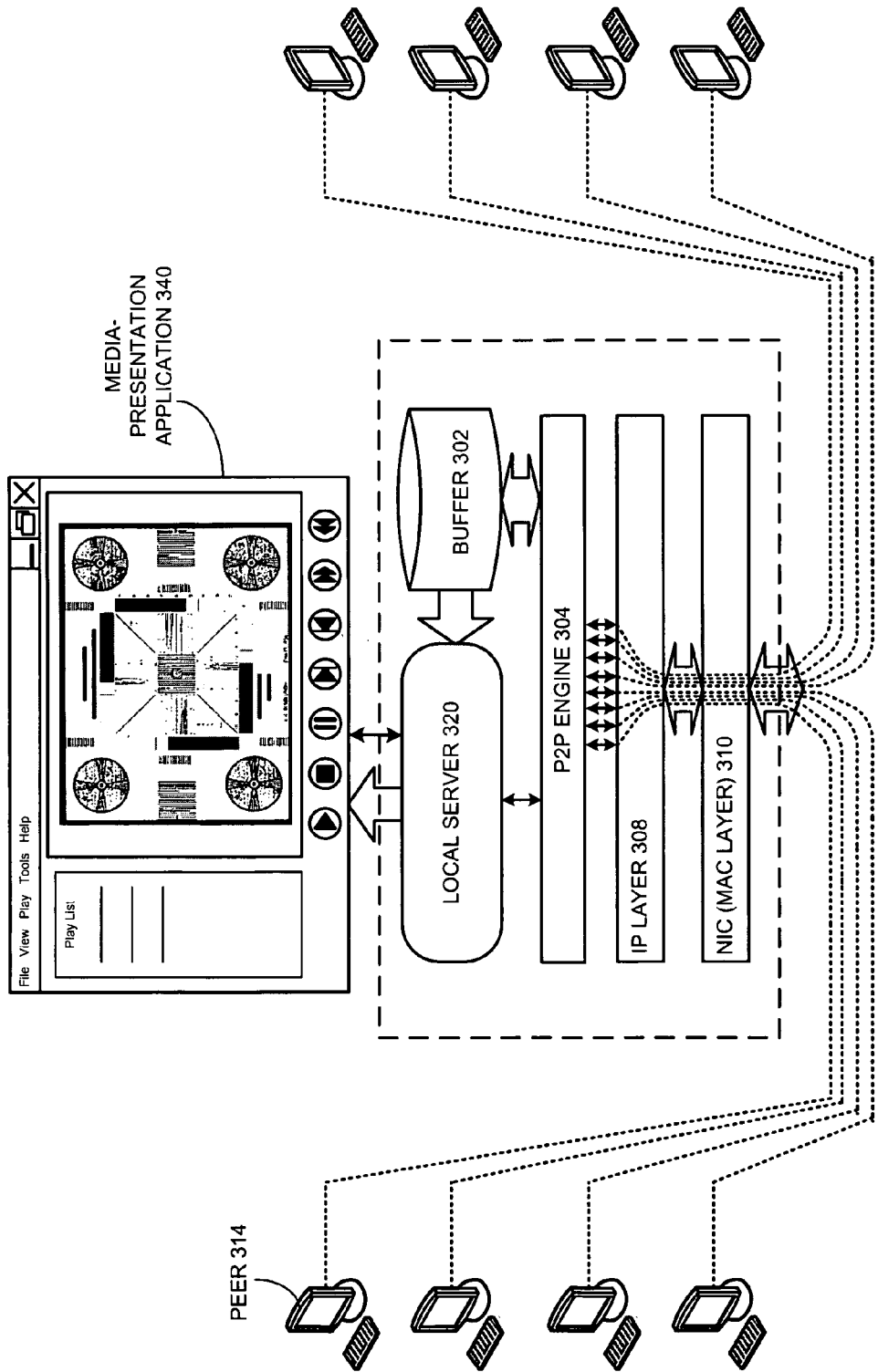
FIG. 3 presents a block diagram illustrating an exemplary architecture for interactively presenting streaming media content with a local server, in accordance with one embodiment.

FIG. 3 presents a block diagram illustrating an exemplary architecture for interactively presenting streaming media content with a local server, in accordance with one embodiment. An end-host system includes a network interface card 310 that implements a Medium Access Control (MAC) layer. The system also implements an Internet Protocol (IP) layer 308. The end host includes a P2P engine 304 and buffer 302. When a user issues a command to receive streaming media content, the P2P engine 304 initializes a P2P session with multiple peer nodes, such as peer node 314. The P2P engine requests media content from the peer nodes based on the data stored on each peer node. The P2P engine 304 subsequently starts receiving data from the peer nodes and stores the received data in the buffer 302. During a P2P session, the P2P engine 304 retrieves the data stored in the buffer 302 and can share the data with other peer nodes.

The end host also includes a local server 320, which fetches the data from the buffer 302 and channels the data to a media-presentation application 340. The local server 320 is initialized when a P2P session starts. When sufficient data has been received and stored in the buffer 302, the local server 320 calls the media-presentation application 340 and starts sending data. The media-presentation application 340 sends user-control information back to the local server 320 and controls local server's reading and sending of data.

For instance, a user may click a "fast-forward" button displayed by the media-presentation application 340. Subsequently, the local server 320 skips certain frames when retrieving data from the buffer 302. The media-presentation software 340 can hence provide an illusion of "speeding up" as the content playback progresses at a higher speed. Based on the user-control information, the local server 320 can also communicate with the P2P engine 304 and affect how data is received from the peers. The media-presentation application 340 can provide other user-control operations, such as "rewind," "slow motion," "pause," and "record." Other operations are possible. Examples of these functions are described below with reference to FIGS. 4-8.

During a P2P session, streaming media content, such as a video stream, is divided into segments, which, in one embodiment, may be of uniform length. A Buffer Map (BM) represents the availability of the segments in a particular node's buffer. The active peer nodes continuously exchange their BM with other active peers and schedule segments to be fetched. Each local host also implements a logical sliding window, which is a block of consecutively stored segments. To facilitate smooth playback and advance live streaming media, local hosts only request segments within the sliding window when requesting data from multiple peers. Additionally, each local host advances the sliding window periodically as time progresses. By choosing a proper sliding-window size, a local host can allocate time sufficient for receipt of the segments and can force the media stream to advance without being blocked by a missing segment.

For example, each segment could contain one second of video. Other segment sizes are possible. Assuming that time latency over one minute is unlikely, a sliding window of at least 120-segments can cover two minutes of playback time, centered about the current time. In one embodiment, the system uses 120 bits to record a BM, with a '1' bit indicating that a segment is available and a '0' bit otherwise. The sequence number of the first segment in the sliding window is recorded by another two bytes, which can be rolled back for extra long video programs greater than 24 hours. Other suitable segment buffering schemes, including variations on number and duration of segments, buffer size, segment representation, and so forth, are possible.

Figure 4:
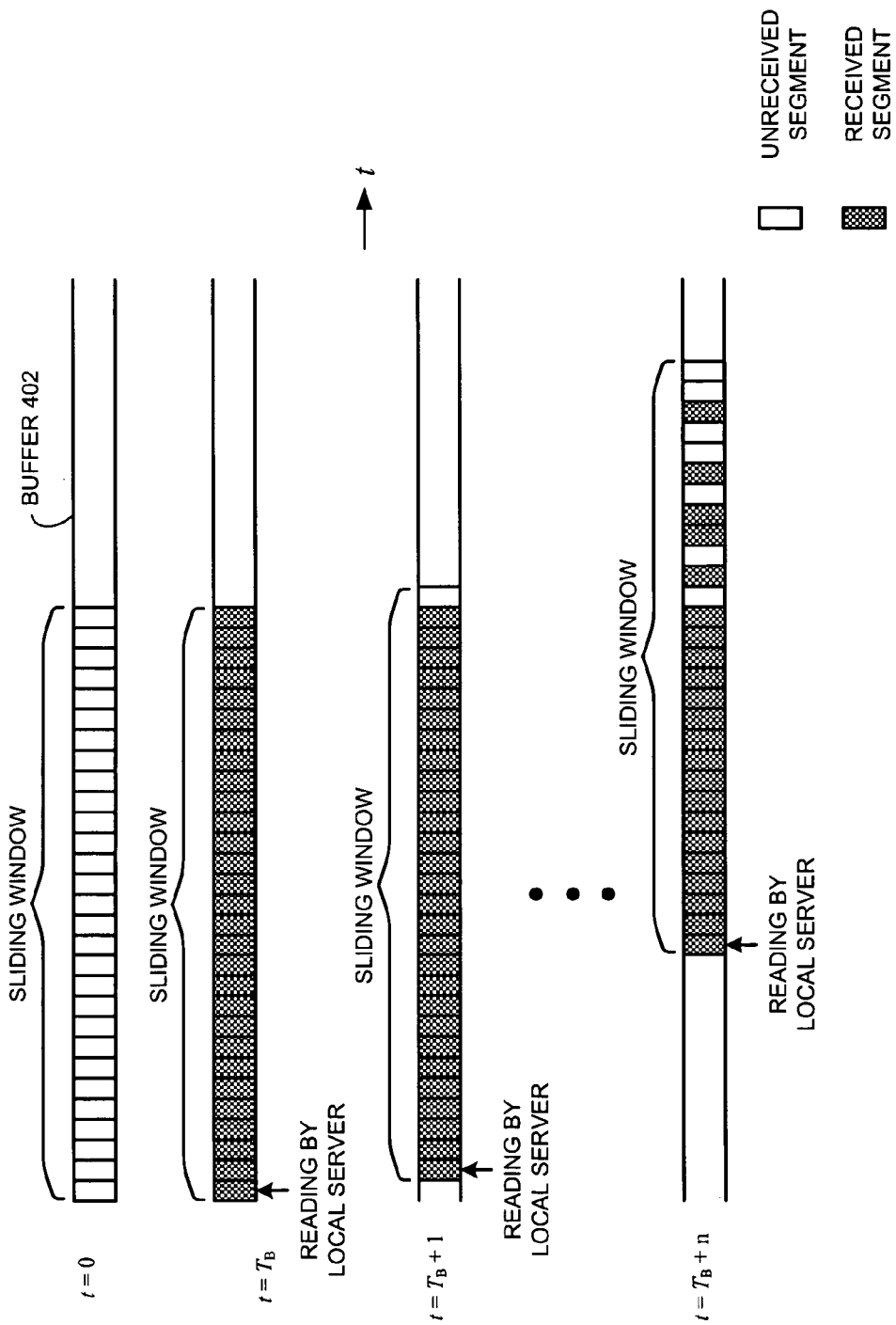
FIG. 4 presents a timing diagram illustrating an exemplary process of buffering data for streaming media content received over a P2P network, in accordance with one embodiment.

FIG. 4 presents a timing diagram illustrating an exemplary process of buffering data for streaming media content received over a P2P network, in accordance with one embodiment. The system uses a buffer 402 to store received data segments for multiple peers. At time t=0, the buffer 402 is empty, and the system initializes a P2P session with peer nodes. The system allocates a pre-determined time, $T_B$, to allow the P2P engine to receive the segments within a sliding window. From time t=0 to time t=$T_B$, the system does not advance the sliding window.

At time t=$T_B$, all the segments within the sliding window are expected to have been received and the system starts advancing the sliding window. Meanwhile, the local server begins reading the first segment within the original sliding window and starts sending the segments to the media-presentation application. At time t=$T_B$+1, the sliding window is advanced by one segment, before which the system requests another segment from a peer node. The local server also reads the first segment within the sliding window. By time t=$T_B$+n, the sliding window has advanced n segments. There may be several unreceived segments within the sliding window due to the inconsistent latency associated with data transfer from different peer nodes.

In one embodiment, the local server reads and sends the segments at the same rate at which the sliding window is advanced, and the media-presentation application plays the streaming media at approximately the same data rate. The local server can read any data segment that has been received and is outside of the sliding window. The system can also discard segments that have been played by the media-presentation application, or, in a further embodiment, can retain the segments for a certain amount of time. In addition to a linear data structure, the buffer 402 can use other data structures to implement the logical functions described above.

FIG. 5 presents a timing diagram illustrating exemplary states of the data buffer before and after "fast-forwarding" of the media content, in accordance with one embodiment. Whenever the sliding window is nearly at capacity with received segments, the local server can fetch additional data from the buffer and advance the reading of data at a rate faster than the rate at which the sliding window advances. The media-presentation application can then provide simulated fast-forwarding of the media presentation by signaling the local server to read additional data.

In one embodiment, when the streaming content is for a video stream, the local server skips a given number of video frames before reading the next frame from the buffer. The local server delivers the read frames to the media-presentation application at a regular frame rate. As a result, the media-presentation application, while playing the frames at the same fixed frame rate, advances the viewed playback at a higher speed. For example, the local server skips every other frame when reading data from the buffer and delivers the read frame to a media player at the regular playback frame rate. The media player plays the received frames at the same frame rate, and a user observes a playback at twice the normal speed.

In a further embodiment, the local server can skip a given number of segments before reading the next segment from the buffer and delivers data to the media-presentation application at the regular frame rate. For example, if each segment contains one second of video and the local server skips every other segment, the user then observes segments of one-second-long video, with one second of video skipped between two segments that are played. The effect is that the overall playback advances at twice the regular speed, while within each one-second segment the playback is at the regular speed.

While the local server advances data reading at a higher frame rate under a fast-forward command, the system can also advance the sliding window at a speed faster than the normal speed, so that the system can request additional segments. Fast-forwarding reduces playback latency and is useful during the playback of live streaming content, because a user can thereby reduce the delay between the live events and the playback. In one embodiment, the media-presentation application can indicate the current state of the segments within the sliding window, for example, number of segments received, so that a user can determine whether fast-forwarding is feasible. The media-presentation application can also automatically fast-forward the presentation based on the current state of the segments within the sliding window.

FIG. 6 presents a timing diagram illustrating exemplary states of the data buffer before and after logical "rewinding" of the media content, in accordance with one embodiment. The system can facilitate simulated rewinding of the media presentation by retaining received segments outside the current sliding window. Whenever a user issues a rewind command, the media-presentation application signals the local server to revert to previously-received segments that have already been presented. The system continues, however, advancing the sliding window to request further segments. In one embodiment, the media-presentation application can simultaneously display the "rewound" playback and the regular playback, preferably in two separate windows.

Similarly, the system can also provide a slow-motion function. Upon receiving a slow-motion command from a user, the media-presentation application signals the local server. The local server starts reading segments from the buffer at a lower speed. However, the local server can duplicate the same frame several times and deliver the frames to the media-presentation application at the regular frame rate. The media-presentation application can hence play the received frames at the regular frame rate to create a slow-motion effect. The slow-motion function may be combined with rewinding so that a user can rewind the media stream to a certain point and play the stream in slow motion.

If the media content is a live video stream, the system can continue advancing the sliding window to receive further segments from peer nodes. Accordingly, the system retains the received segments that have not yet been read by the local server. As time progresses, received segments can gradually fill the buffer. In one embodiment, the system monitors the buffer and, if the number of buffered segments reaches a certain threshold, the system automatically cancels the slow-motion operation and resumes regular playback. The user can also fast-forward the playback, which reduces the number of buffered segments. In one embodiment, the media-presentation application may simultaneously display the slow-motion playback and the regular playback, preferably in two separate windows.

Figure 7:
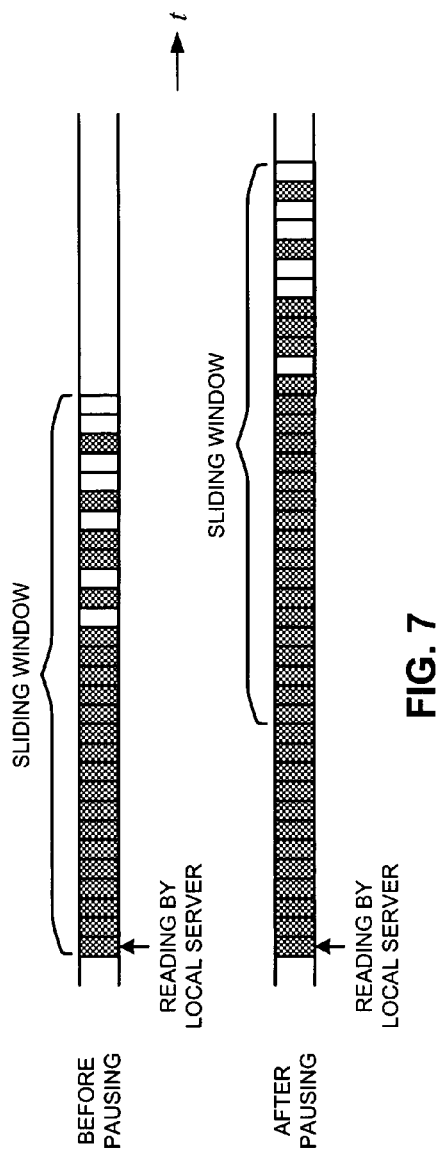
FIG. 7 presents a timing diagram illustrating exemplary states of the data buffer before and after logical "pausing" of the media content, in accordance with one embodiment.

FIG. 7 presents a timing diagram illustrating exemplary states of the data buffer before and after logical "pausing" of the media content, in accordance with one embodiment. In one embodiment, the system can facilitate a simulated pause function for the playback of the streaming media. Upon receiving a pause command from a user, the media-presentation application signals the local server to temporarily suspend the reading of segments and halts the current playback. Meanwhile, the sliding window continues the advancement to allow additional segments to be requested. The system retains the received segments that have not yet been read by the local server. In one embodiment, the system monitors the buffer and, if the number of buffered segments reaches a certain threshold, the system automatically cancels the slow-motion operation and resumes regular playback. In a further embodiment, the media-presentation application can simultaneously display the paused playback and the regular playback, preferably in two separate windows. Moreover, the pause function can be combined with other functions such as fast-forward, rewind, or slow motion.

Figure 8:
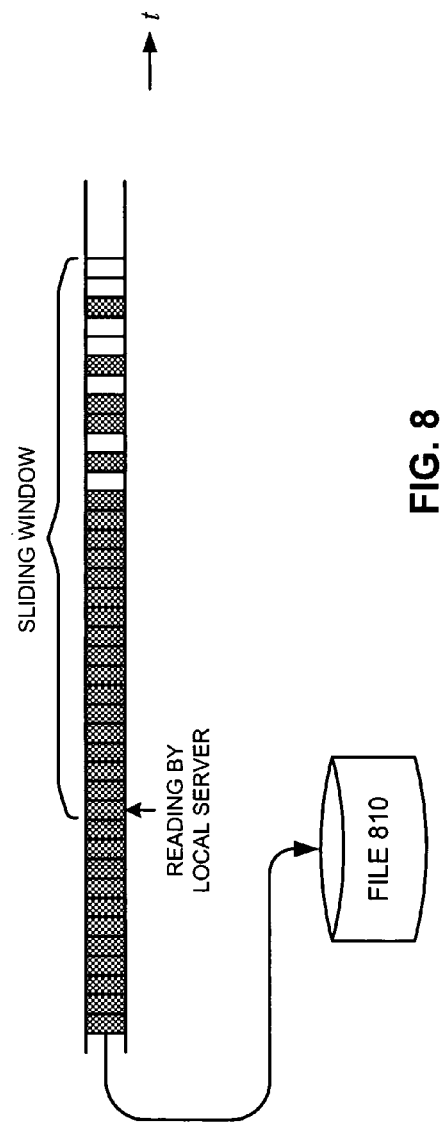
FIG. 8 illustrates an exemplary process of recording the media content delivered over a P2P network, in accordance with one embodiment.

FIG. 8 illustrates an exemplary process of recording the media content delivered over a P2P network, in accordance with one embodiment. In one embodiment, the system allows a user to record the streaming media, subject to applicable copyright and licensing restraints. Upon receiving a record command from a user, the media-presentation application signals the local server to open a local file 810 and save the segments in the file. While reading the segments, the local server copies the segments into the file 810, thereby allowing the user to view and access the media content at a later time. Meanwhile, the sliding window continues the advancement to receive additional segments. The record function can be activated at any time during playback and can be combined with other functions.

Figure 9:
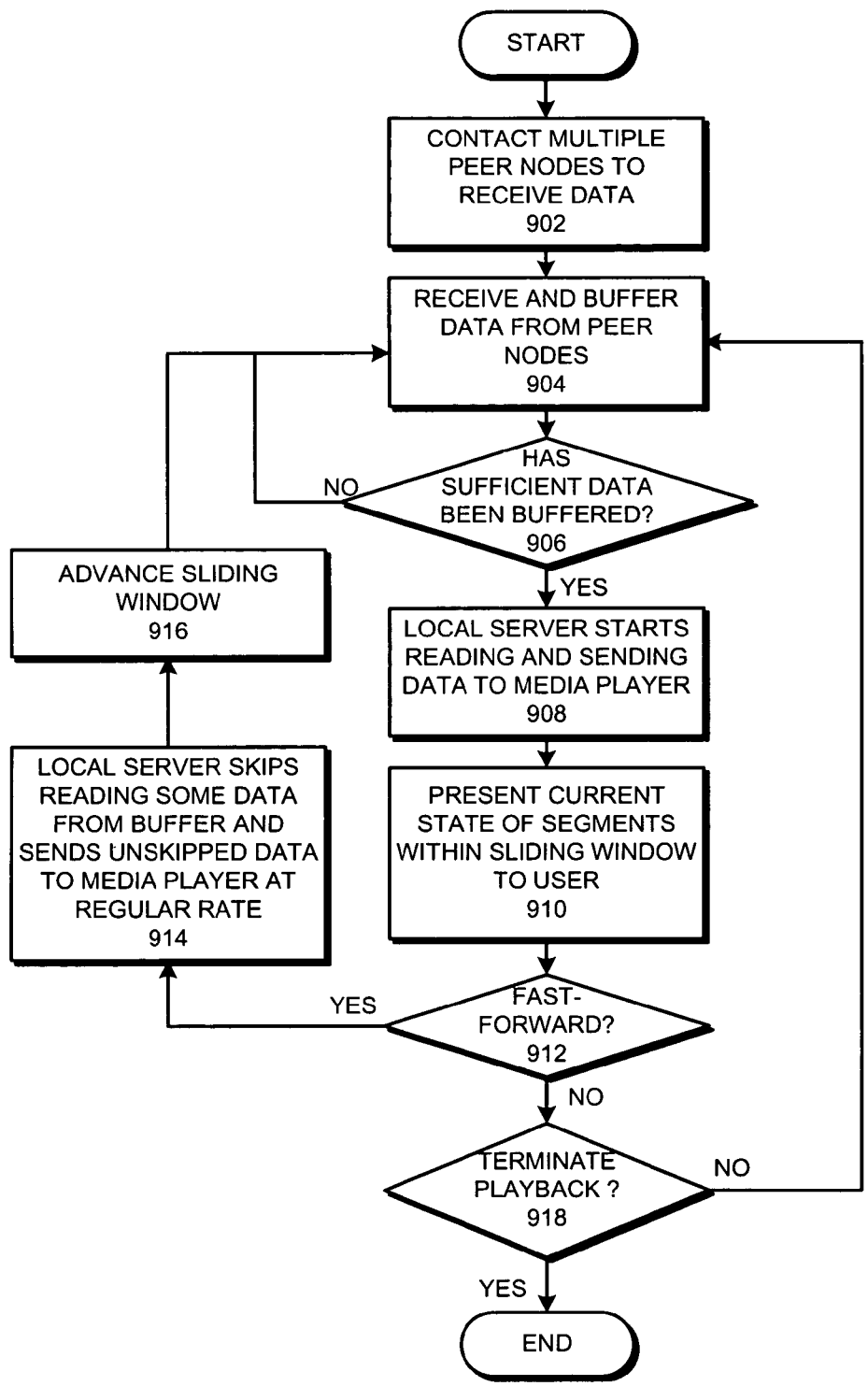
FIG. 9 presents a flow chart illustrating an exemplary process of fast-forwarding steaming media content delivered over a P2P network, in accordance with one embodiment.

FIG. 9 presents a flow chart illustrating an exemplary process of fast-forwarding steaming media content delivered over a P2P network, in accordance with one embodiment. During operation, the system contacts multiple peer nodes to begin receiving data (step 902). After a P2P session is initialized, the system starts receiving and buffering the data transferred from the peer nodes (step 904) and determines whether sufficient data has been buffered to fill the sliding window (step 906).

If the system has not received sufficient data and the segments within the initial sliding window have not all been received, the system continues the receipt and buffering of data (step 904). Otherwise, the local server starts reading and sending the received data to the media player (step 908). The system subsequently presents the current state of the segments within the sliding window to the user through the media player (step 910) and determines whether the user has issued a fast-forward or other command (step 912).

If the user has issued a fast-forward command, the local server skips reading certain data from the buffer and sends the unskipped data to the media player at the regular data rate (step 914). The system continues the advancement of the sliding window (step 916). If fast-forward command has not been issued by the user, the system further determines whether the user has issued a command to terminate the media playback (step 918). If not, the system continues the receipt and buffering of data from the peer nodes (step 904). Otherwise, the system exits.

Although described though exemplary implementation of the fast-forward function, other simulated playback functions, such as rewind, slow motion, pause, and record can be implemented in similar fashion. Additionally, the system can use other processes to implement these and other functions.

While the invention has been particularly shown and described as referenced to the embodiments thereof, those skilled in the art will understand that the foregoing and other changes in form and detail may be made therein without departing from the spirit and scope of the invention.

What is claimed is:

1. A system for presenting streaming media content delivered through a peer-to-peer overlay network, comprising:
    a peer-to-peer (P2P) data-transfer mechanism for receiving, from a plurality of peer nodes, data for the streaming media content, wherein segments of the data are located within a logical sliding window which advances periodically;
    a buffer for storing the received data for the streaming media content;
    a media-presentation module for presenting the streaming media content; and
    a server module for fetching the data stored in the buffer, wherein the server module is located on a same machine as the media-presentation module;
    wherein while presenting the streaming media content, the media-presentation module is configured to:
        identify the server module based on an Internet Protocol (IP) address assigned to the machine where the server module and the media-presentation module are co-located;
        receive the data for the streaming media content from the identified server module; and
        present the streaming media content.

2. The system of claim 1, wherein the media-presentation module indicates which segments within the logical sliding window have been received.

3. The system of claim 1,
    wherein the media-presentation module allows presentation of media content to be rewound by signaling the server module;
    wherein in response to a rewind signal, the server module sends previously received data that have already been presented; and
    wherein while presentation of media content is rewound, the data-transfer mechanism continues receiving data segments and advancing the logical sliding window.

4. The system of claim 1,
    wherein the media-presentation module presents the media content in slow motion by signaling the server module and receiving data from the server module at the regular playback data rate;
    wherein in response to a slow-motion signal, the server module:
        reads data from the buffer at a lower rate;
        duplicates the data read from the buffer; and
        sends the duplicated data to the media-presentation module at the regular playback rate; and
    wherein while presentation of media content is in slow motion, the data-transfer mechanism continues receiving data segments and continues advancing the logical sliding window.

5. The system of claim 1,
    wherein the media-presentation module allows presentation of media content to be paused by signaling the server module;
    wherein in response to a pause signal, the server module suspends reading of the data from the buffer; and
    wherein while presentation of media content is paused, the data-transfer mechanism continues receiving data segments and continues advancing the logical sliding window.

6. The system of claim 1, further comprising a recording mechanism for copying the data stored in the buffer into a file, thereby allowing the streaming media content to be recorded for playback at a later time.

7. An apparatus for facilitating interactive presentation of streaming media content delivered through a peer-to-peer overlay network, comprising:
- a processor;
- a memory;
- a peer-to-peer (P2P) engine for receiving segments of data for streaming media content from a plurality of peer nodes,
  - wherein the received data segments are located within a logical sliding window, which advances periodically;
- a buffer for storing the received data for the streaming media content;
- a media player for presenting the streaming media content; and
- a software server for fetching data stored in the buffer, wherein the software server is located on a same machine as the media player;
- wherein while presenting the streaming media content, the media player is configured to:
  - identify the software server based on an Internet Protocol (IP) address assigned to the machine where the software server and the media player are co-located;
  - receive the data for the streaming media content from the identified software server; and
  - present the streaming media content.

8. A method for presenting streaming media content delivered through a peer-to-peer (P2P) overlay network, comprising:
- receiving, at a computer, data for the streaming media content from a plurality of peer nodes, wherein segments of the data are located within a logical sliding window which advances periodically;
- storing the received data in a buffer;
- presenting the streaming media content through a media-presentation mechanism located on the computer; and
- facilitating user-initiated control over presentation of the streaming media content through a local software server, wherein the local software server is located on the same computer as the media-presentation mechanism; and
- wherein presenting the streaming media content involves:
  - identifying the local software server based on an Internet Protocol (IP) address assigned to the computer where the local software server and the media-presentation mechanism are co-located,
  - triggering the local software server to fetch data for the streaming media content from the buffer, and
  - receiving the fetched data for the streaming media content from the identified local software server.

9. The method of claim 8, further comprising indicating which segments within the logical sliding window have been received.

10. The method of claim 8, further comprising:
- allowing presentation of media content to be rewound by signaling the local software server;
- in response to a rewind signal sending by the local software server to the media-presentation mechanism previously received data that have already been presented; and
- continuing receiving data segments and advancing the logical sliding window while presentation of media content is rewound.

11. The method of claim 8, further comprising:
- presenting the media content in slow motion by signaling the local software server and receiving data from the local software server at the regular playback data rate;
- wherein after receiving a slow-motion signal, the local software server:
  - reads data from the buffer at a lower rate;
  - duplicates the data read from the buffer; and
  - sends the duplicated data to the media-presentation mechanism at the regular playback rate; and
- wherein while presentation of media content is in slow motion, the method further comprises continuing receiving data segments and advancing the logical sliding window.

12. The method of claim 8, further comprising:
- allowing presentation of media content to be paused by signaling the local software server;
- wherein responsive to a pause signal, the local software server suspends reading of the data from the buffer; and
- wherein while presentation of media content is paused, the method further comprises continuing receiving data segments and advancing the logical sliding window.

13. The method of claim 8, further comprising recording the streaming media content for playback at a later time by copying the data stored in the buffer into a file.

14. A non-transitory computer-readable storage medium storing instructions that when executed by a computer cause the computer to perform a method for interactively presenting streaming media content delivered through a peer-to-peer overlay network, the method comprising:
- receiving, at a peer-to-peer (P2P) data-transfer mechanism, data segments for streaming media content from a plurality of peer nodes, wherein the data segments are located within a logical sliding window which advances periodically;
- storing the received data in a buffer; and
- facilitating user-initiated control over presentation of the streaming media content through a local software server and a media player,
- wherein the local software server and the media player are located on a same computer,
- wherein the local software server fetches the data from the buffer and sends the data to the media player in response to being identified by the media player based on an Internet Protocol (IP) address assigned to the computer where the local software server and the media player are co-located.

* * * * *